United States Patent [19]
Benning et al.

[11] Patent Number: 5,917,823
[45] Date of Patent: Jun. 29, 1999

[54] X.25 ACCESS TO FRAME RELAY NETWORK

[75] Inventors: Rex Benning, Kanata; Keith Allan, Nepean; Jim Hurd, Ottawa, all of Canada

[73] Assignee: Newbridge Networks Corporation, Ontario, Canada

[21] Appl. No.: 08/737,808

[22] PCT Filed: Jun. 7, 1995

[86] PCT No.: PCT/CA95/00329

§ 371 Date: Feb. 4, 1997

§ 102(e) Date: Feb. 4, 1997

[87] PCT Pub. No.: WO95/34151

PCT Pub. Date: Dec. 14, 1995

[30] Foreign Application Priority Data

Jun. 7, 1994 [GB] United Kingdom .................... 9411357

[51] Int. Cl.⁶ .................................................. H04L 12/56
[52] U.S. Cl. .......................... 370/397; 370/466; 370/471; 370/474
[58] Field of Search ...................... 370/389, 392, 370/395, 396, 397, 400, 401, 409, 465, 466, 467, 471, 474, 902; 385/285, 500, 200.6, 200.78, 200.8

[56] References Cited

U.S. PATENT DOCUMENTS

| | | | |
|---|---|---|---|
| 5,251,207 | 10/1993 | Abensour et al. | 370/470 |
| 5,490,140 | 2/1996 | Abensour et al. | 370/397 |
| 5,490,141 | 2/1996 | Lai et al. | 370/397 |
| 5,521,909 | 5/1996 | Holloway et al. | 370/404 |
| 5,533,017 | 7/1996 | Thor | 370/471 |
| 5,535,199 | 7/1996 | Amri et al. | 370/392 |
| 5,600,798 | 2/1997 | Cherukuri et al. | 370/401 |
| 5,734,654 | 3/1998 | Shirai et al. | 370/401 |

OTHER PUBLICATIONS

International Conference on Networks, Sep. 5, 1991, Singapore pp. 393–400 A.K. Roy, "Frame Relay and its Transport Dilemma" see the whole document.

Communications International, vol. 19, No. 2, Feb. 1992, GB pp. 46–48 N Rickard "Frame Relay the Best of Both Worlds?".

*Primary Examiner*—Alpus H. Hsu
*Attorney, Agent, or Firm*—Marks & Clerk

[57] ABSTRACT

A packet switching network supporting X-series protocol access employs PVC (Permanent virtual connection) trunks as the backbone trunks for the network.

7 Claims, 13 Drawing Sheets

X.25 ACCESS TO FRAME RELAY NETWORK

FIELD OF THE INVENTION

This invention relates to a PVC backbone for packet switching networks capable of implementing CCITT X protocols, such as the X.25 protocol.

BACKGROUND OF THE INVENTION

The primary protocol to be implemented by the X.25 service is the X.25 CCITT standard, 1988 version. Other related protocols are X.75, X.32, and the "triple X" PAD (Packet Assembler-Dissembler) (X.3, X.28, X.29).

Until now, packet switches have been built on trunking and routing systems that use simple circuit switching or point-to-point data communications technologies. This provided no flexibility and control of the individual virtual circuits when parts of the backbone network became congested.

X.25 is an interface specification for statistically multiplexing several independent data streams onto common facilities. It uses a link layer based on HDLC frames, using LAPB between the DTE and the DCE.

An object of this invention is to provide an improved network supporting X-series packet and call protocol.

BRIEF SUMMARY OF THE INVENTION

Accordingly the present invention provides a packet switching network supporting X-series protocol access wherein PVC trunks are employed as the backbone trunks for the network.

The invention also provides a node for use in a data transmission system comprising a hardware platform having sufficient memory, processing power and fanout to support X-series protocol access; processing means providing support for HDLC and LAPB at the link level, and standard X-series packet and call-control protocol; a packet transport system for transmitting packets between data communications equipment (DCE's) with no errors, no loss and in-sequence; and a routing system to establish a virtual connection between DCEs within specified time limits, and maintain connectivity in the event of failures, errors and congestion.

Preferably, the node includes a management system that provides the configuration data for the above system, and integrated management services, a system for reliably gathering accounting data from the nodes, and a system for validating Network User Identifiers.

The X-series protocol may be X.25 operating at speeds of 9.6 K to T1/E1.

Each node that supporting X.25 has one or more X.25 Packet Engines. This Packet Engine supports X.25 interfaces to users on either its own access ports, or through subrate interfaces. The X.25 Packet Engines connect to other X.25 packet engines through frame relay PVCs. These PVCs terminate on software processes within the Packet Engines. They act as trunks over which the X.25 data packets are multiplexed by the X.25 transport and routing software on the Packet Engine.

This invention employs the frame relay protocol described in: ANSI T1.602, ANSI T1.606, ANSI T1S1/90-175, ANSI T1.617 - DSS 1, ANSI T1.618 - DSS1, CCITT Recommendation I.122, CCITT Recommendation Q.922, CCITT Recommendation Q.933.

The flow control procedures are based on CCITT Recommendation Q.922 and Frame Relay Forum Technical Committee Document Number FRFTC 92.15 "Frame Relay X.25 Interworking Implementation Agreement."

The X.25 protocol is described in CCITT Recommendation X.25.

The invention still further provides a method of transferring data comprising receiving X.25 LAPB frames, characterized in that it comprises the steps of establishing a permanent virtual connection between data communications equipment (DCE's), encapsulating the X.25 LAPB frames into frame relay frames and attaching a DLCI identifier, transmitting the encapsulated frames over bewteen the DCE's over the PVC, and stripping off the frame relay header from the received encapsulated frames to restore the LAPB frames.

This invention overcomes the above difficulties experienced in conventional systems by using PVCs, for example frame relay PVC's, as the backbone trunks for a packet switching network. This allows the use of frame relay explicit congestion notification to individually flow control virtual circuits. By integrating the frame relay PVCs into a routing system that monitors the states of the PVCs and uses an OSPF-like (Open Shortest Path First) procedure to calculate paths over the PVCs, a more robust and reliable backbone network is created. This robustness is further enhanced by the use of the frame relay Explicit Congestion Notification bits, the techniques of Q.922, and the procedures in this invention to flow control the individual virtual circuits.

X.25 is the primary packet-switching protocol to be supported. The interface to the backbone is based on C language subroutine calls for virtual circuit setup, packet transfer and flow control, so any other packet oriented protocol (such as SNA) may be supported through this interface.

The memory required to handle the storage and buffer requirements is defined by the following formula. The formula is based on: (ports*LCNs*average packet size*average window size)+total software.

A real-time clock is required to provide accurate start and end times in the accounting records if the software cannot provide timing accurate within 1 second.

The requirement for economical fanout at lower speeds means that HDLC frame streams between the DTE (user) and the DCE (Packet Engine) must be multiplexed onto DSOs, for example, using DTUs, and subrate interfaces. This allows very effective backhaul from central offices direct to the packet engine.

BRIEF DESCRIPTION OF THE DRAWINGS

The invention will now be described in more detail, by way of example only, with reference to the accompanying drawings, in which.

DETAILED DESCRIPTION OF THE INVENTION

Figure 1:
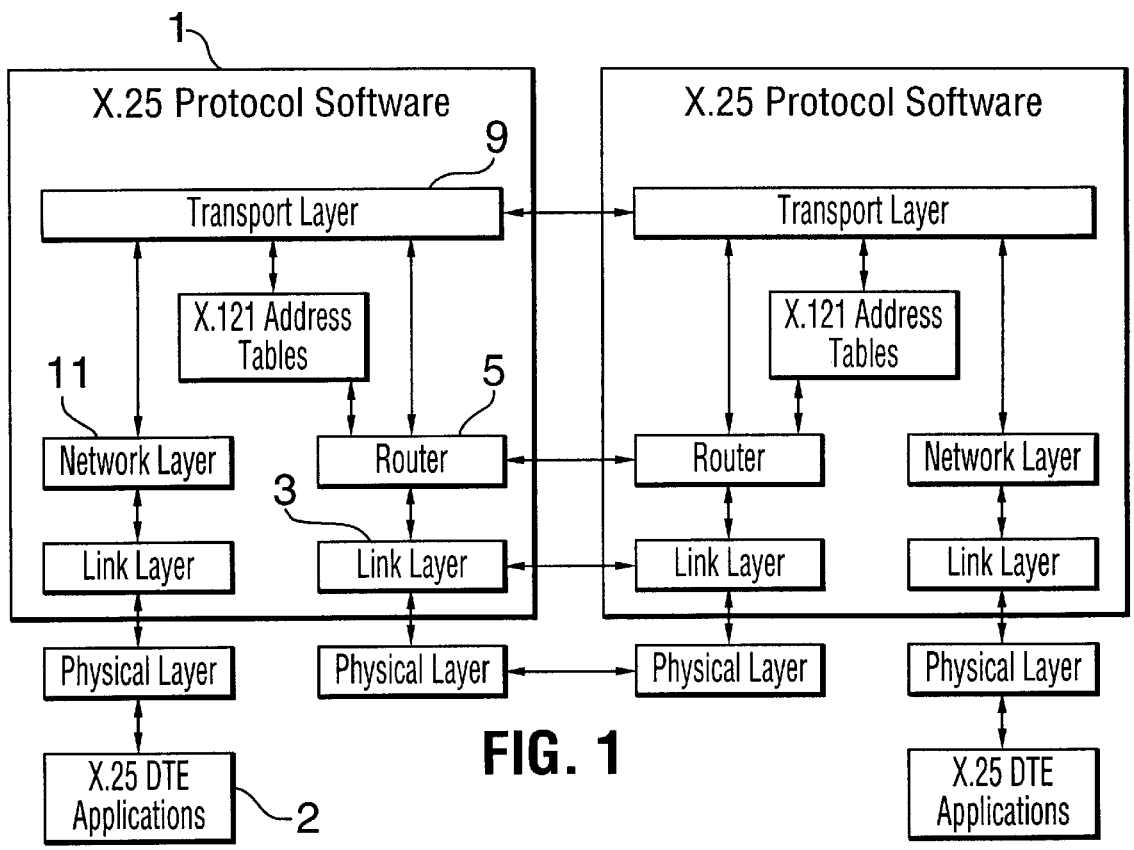
FIG. 1 shows a pair of X.25 packet engines.

As shown in FIG. 1, the X.25 protocol is implemented in layers of smaller subsystems. The X.25 Packet Engine 1 provides X.25 DCE (Data Communications Equipment) functionality, allowing any X.25 DTE 2 (Data Terminal Equipment) to connect using the CCITT X.25 standard.

The link level connection 3 uses the standard CCITT X.25 LAPB (Link Access Protocol Balanced) protocol as implemented by Trillium software.

The X.25 Engine 1 receives packets from the DTE 2 encapsulated within HDLC frames as described in the X.25 standard. Requests to set up SVCs (Switched Virtual Circuits) are sent in-band by using call request packets. They contain the requested address, an LCN (Logical channel number) to use for multiplexing subsequent data packets, and a variable length list of facilities (call-options) requested for the duration of the call.

Figure 2:
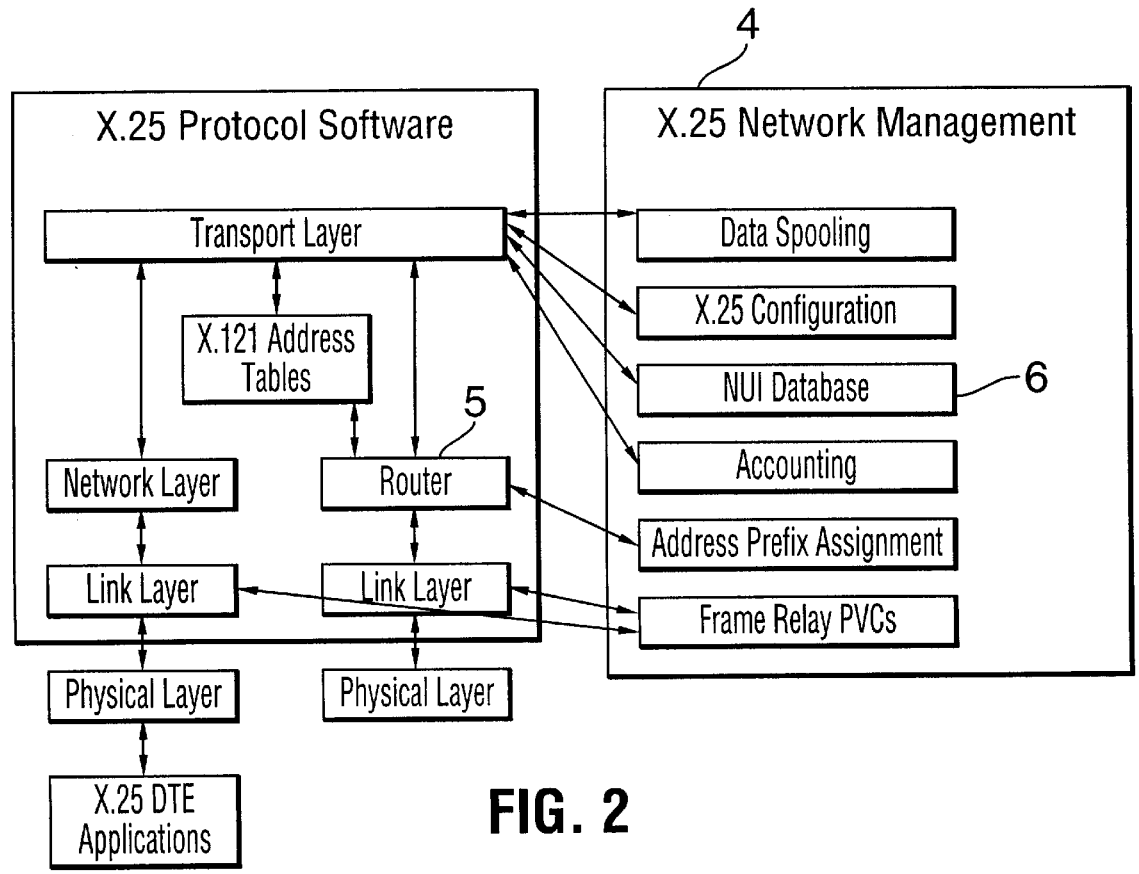
FIG. 2 shows an X.25 packet engine interfacing with an X.25 network management system.

Network management data is received from the network manager 4 (FIG. 2). The following table summarizes the activities of the network manager 4.

| ACTION | DATA ITEMS | CROSS-CHECKS |
| --- | --- | --- |
| 1. Configure network (alter, delete) | Network name, herald Address format, escape digits Default packet size and ranges Default window sizes and ranges (mod 8, mod 128) Segment size Accounting intervals DNIC | None |
| 2. Configure X.25 Engine (alter, delete, move, copy, schedule) | Routing ID Hardware address Software modules and versions Configuration parameters | 3600 node control data |
| 3. Assign Frame Relay trunks (alter, delete, move, copy, schedule) | Endpoint addresses of X.25 Engines Frame Relay parameters | Frame relay assignment parameters X.25 Engine assignments |
| 4. Configure X.25 Port (alter, delete, move, copy, schedule) | LCN ranges Routing I.D. Facilities Billing information X.25 Gateway information and address translation tables | X.25 Engine definition Hardware addresses Memory engineering Processor engineering X.121 addresses |
| 5. Assign X.121 address (delete, move, schedule) | X.121 address X.25 port and LCN | X.25 port assignment Network configuration X.121 address uniqueness |
| 6. Assign CUG | CUG directory, options | X.121 addresses |
| 7. Assign X.25 PVC (alter, delete, move, copy, schedule) | PVC address, endpoint LCNs | X.121 addresses X.25 port assignment LCNs |
| 8. Configure NUI (alter, delete, schedule) | NUI id, password, billing information | None |
| 9. Configure Hunt Group (alter, delete, schedule) | HG Address Call distribution options | X.121 addresses |
| 9. Collect Accounting | Call reference number Addresses Start time and duration segments transferred facilities requested | |
| 10. Monitor alarms | Alarm type source severity time additional data | |
| 11. Define spooling site | | |

The routing system 5 receives routing and topology information from peer systems in other nodes. The routing system 5 monitors the states of the PVCs and uses an OSPF-like procedure to calculate paths over the PVCs. The X.25 Engine receives NUI (Network User Identifier) validation responses from the NUI database 6. This provides validation information for any NUI in the network. It must be accessible from any port in the network. It must also provide administration functions for password change, NUI cancellation, and indications of usage.

At least 200 NUI/Passwords must be stored on the Packet Engine to provide a fast NUI validation by the X.25 transport layer. This table will become a local cache for the global NUI database system, but will initially be downloaded from a simple NUI managment function.

The X.25 Engine 1 sends packets to the DTE 2 encapsulated within HDLC frames as described in the X.25 standard.

Network alarms, status indicators and statistics are delivered to the network management system 4.

The routing system 5 sends routing and topology information to peer systems in other nodes.

The X.25 link layer, packet layer and transport layer software run on the Packet Engine (FIG. 3), as does the routing system and Frame Relay PVC trunks. The Packet Engine is based on a standard Frame Relay Engine with the additional of 16 Megabytes of memory and a real time clock and includes network address tables 20, X.25 access interfaces 21, Network management interfaces 22, packet routing system 23, and frame relay trunk interfaces 24.

The X.25 DCE Data Link Layer 3 provides access via subroutines. It receives HDLC frames either directly from drivers handling the super-rate interfaces, or from the sub-rate feeder interface.

The DCE Network Layer 11 is also a port of the Trillium X.25/X.75 DCE interface software to run on the Packet Engine.

The X.25 Transport Layer 9 provides a packet-transport protocol for the X.25 DCE Network Layer, using the X.25 routing system and frame relay PVC trunks. It provides the following services:

- At call setup, translates the X.121 addresses in the address tables 12 in the call packet to internal routing ids, and binds the two ends of the virtual circuit
- buffers transmitted packets and starts a retransmission timer
- releases the buffer and stops the timer upon receipt of an acknowledgment

- retransmits the packet upon time-out
- acknowledges received packets, discard duplicates, and resequence any packets received out of order
- delivers packets to the Trillium network layer software in order
- flow controls packets from the Trillium network layer using congestion information received from the frame relay trunks, based on Q.922 Annex A and Frame Relay forum standards
- detects errors and recover appropriately—reset or clear the call only if absolutely necessary
- responds to queries from the network management system
- collects and forwards accounting data.

The X.25 Transport Layer 9 thus manages the connection between the X.25 DCE software and the X.25 routing system. The X.25 DCE software provides subroutine calls to deliver and receive packets from a network layer. It expects this layer to handle the transport of packets through the network. The X.25 Transport Layer 9 makes the best use of the features available from the routing and trunking system. It handles the translation of X.121 addresses to routing ids when it binds the ends of an SVC during call setup. It forwards packets to the X.25 routing system, buffer and time the packets for retransmission, and either retransmit on timeout or discard upon receipt of an acknowlegment. It receives packets from the X.25 routing system, acknowledge them, and forward them to the X.25 packet layer in the proper sequence and without duplicates.

Figure 4:
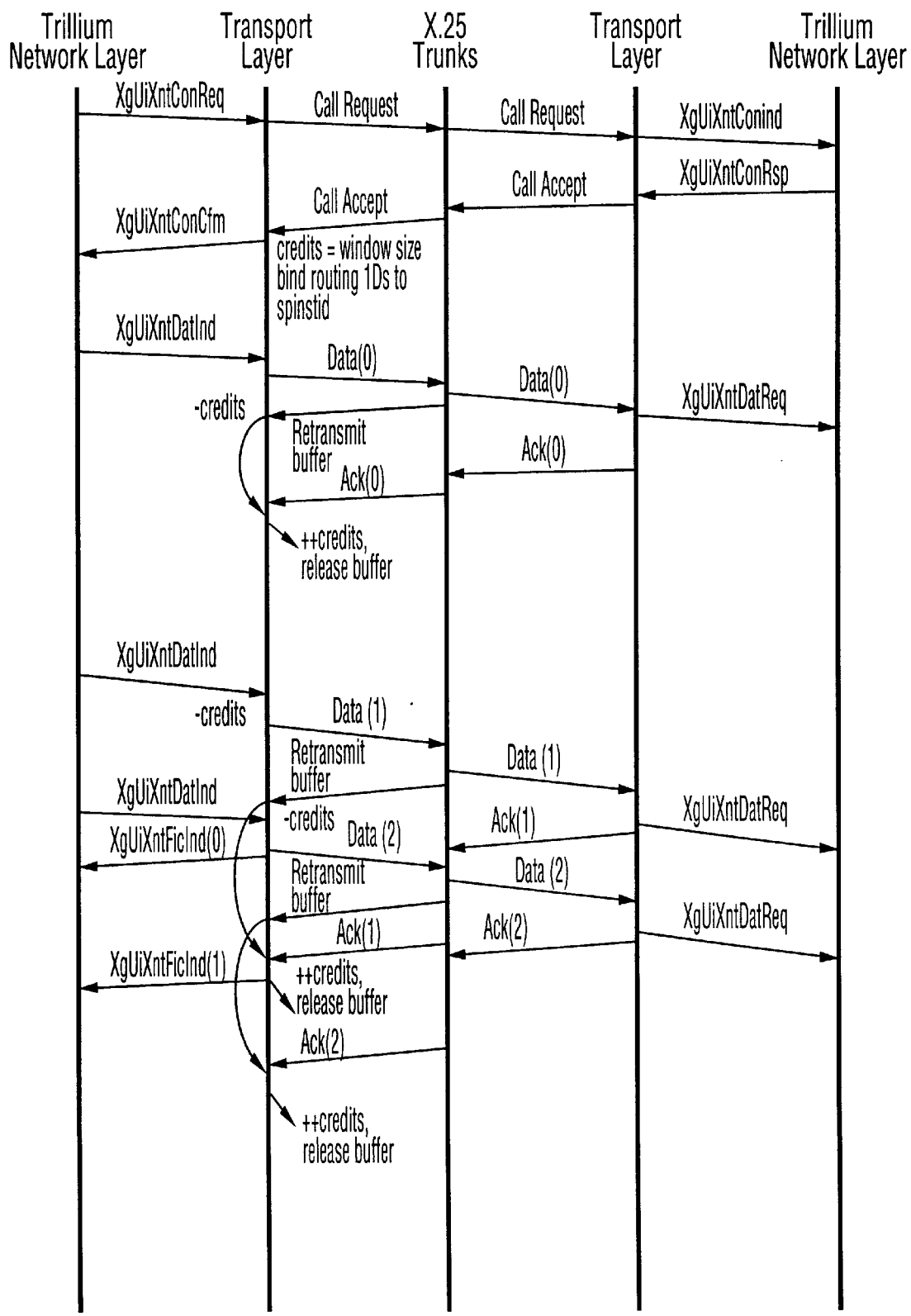
FIG. 4 shows details of the packet flow control.
Figure 5:
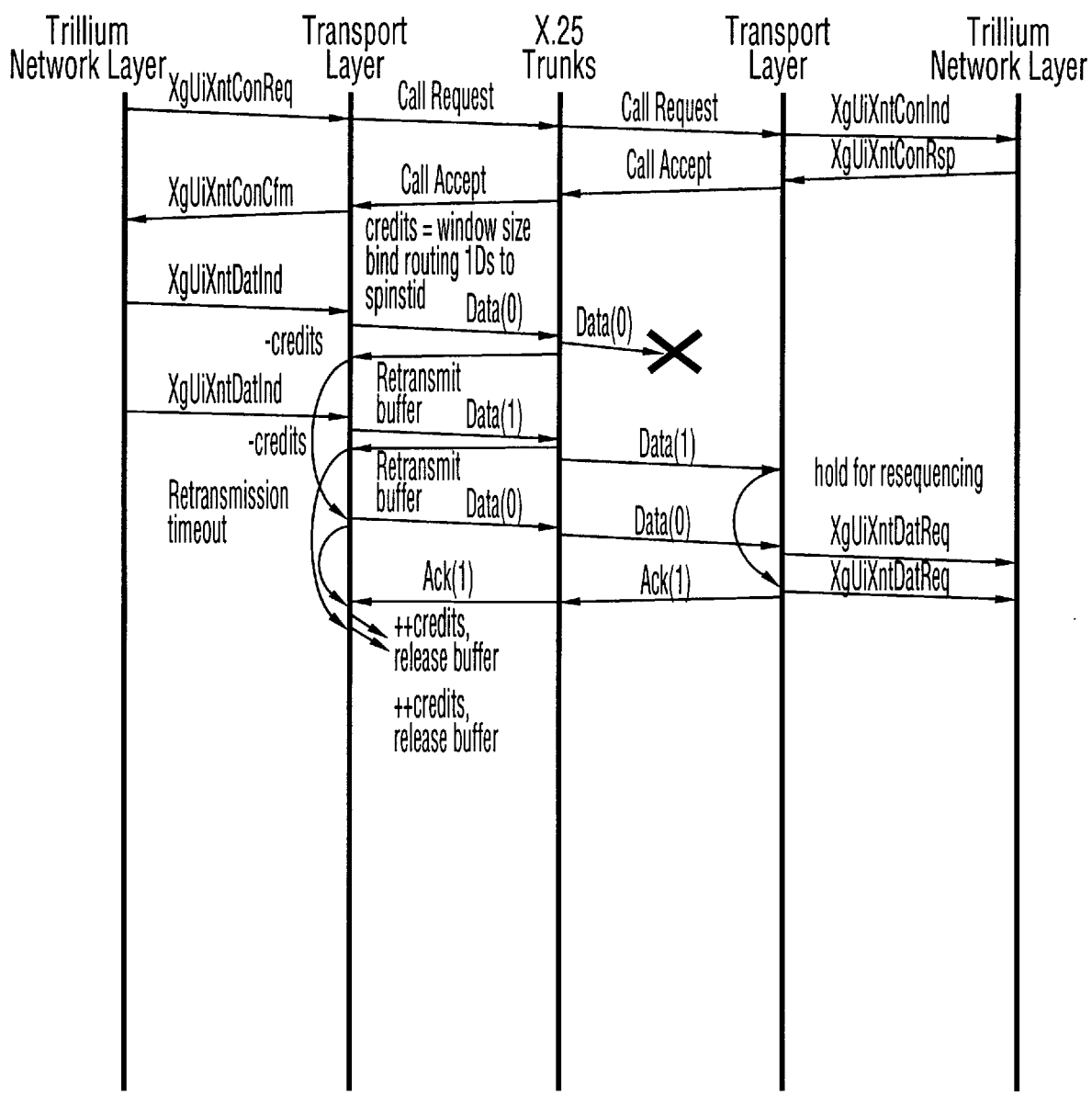
FIG. 5 the packet loss and recovery scheme.

The X.25 transport layer 9 must also provide flow control to the packet layer. Details of the packet flow control are shown in FIGS. 4 and 5. It makes use of the Explicit Congestion Notification bits from the frame relay protocol used by the trunking system to dynamically adjust the window sizes of any virtual circuit that may be experiencing congestion. When a call request is sent through the Transport Layer, it will record the assigned or negotiated window size for the call, and assign that number of "credits" to the virtual circuit. The credit counter will be decremented for each packet received from the packet layer, and incremented for each acknowledgment received from the trunking system. If the credit counter ever reaches 0, then a flow control notification will be sent to the packet layer. When the credit counter eventually increases, the flow control notification will be cancelled.

The reception of a packet with the BECN bit set indicate that that particular virtual circuit was following a route that was experiencing some form of congestion. Rather than immediately disrupt the network by trying to re-route or re-establish the call, an attempt will be made to temporarily throttle the data flowing on the virtual circuits over that route until the congestion is resolved. This is done by decreasing the current credit count to some fraction of the original window size, but never less than one. This will cause flow control notifications to be sent more frequently, reducing the throughput and hence congestion on that route. If the packets being received on that virtual circuit no longer have the BECN bits set, the credit count will be gradually increased back to the original window size. The packets may start arriving with clear BECN bits for two reasons: either the congestion has cleared up, or the routing system has re-routed the path over a different set of trunks. In both cases, it is valid to stop throttling the data. The techniques used for adjusting the credit counts are based on the window adjustment techniques and CCITT standard Q.922, Annex I.

Figure 3:
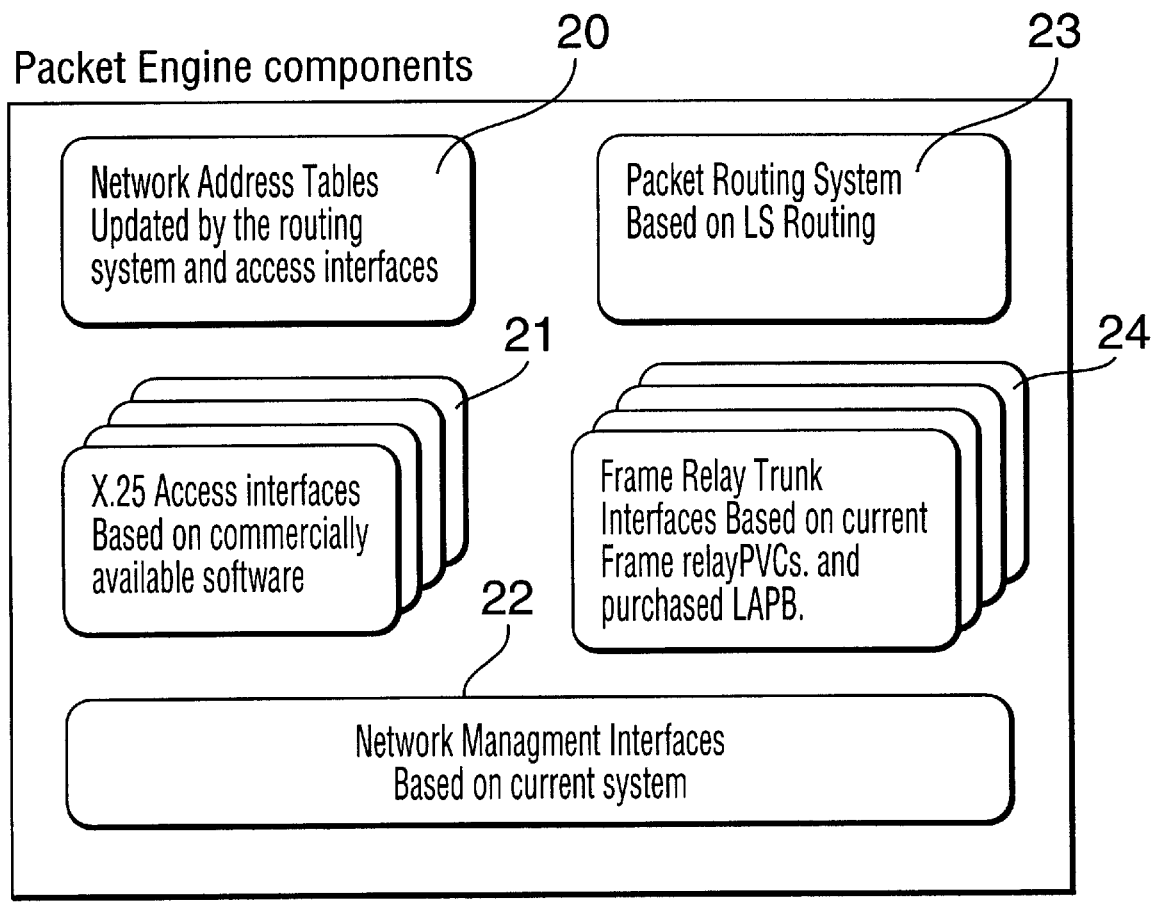
FIG. 3 is a block diagram of an X.25 frame relay packet engine.

Referring to FIG. 3, the network address tables 23 must provide a network-wide, consistent mapping of X.121 addresses to routing addresses that are understood by the packet routing system. The X.121 address can be as long as 19 BCD digits. The routing id's consist of two parts: the packet engine address, and the port address on the packet engine.

Given the number of addresses that must be supported in a large network, it is required to optimize the storage requirements. (50,000 address*(8 bytes per address+4 bytes per routing id)=600 K bytes of storage.) The demands for fast call setups also requires fast table access.

One way to shorten the tables is to put only the information required at each node into its tables, and to partition the address assignments to each node. Outgoing packets only need to map the address as far as required to determine the destination node id. Each node keeps a full mapping of address to final hardware id for the ports directly on that node.

Each node is assigned one or more address prefixes, analogous to an area code on the telephone network. The LSRouter (or generic frame router) can be used to exchange this information along with its routing table updates. This insures that the information is consistent and up to date throughout the network.

The X.25 Packet Routing (LSRouter) 23 is an adaptation of the CPSS LSRouter. This system receives outgoing packets from the transport layer 9 and enqueues them for the X.25 trunk as indicated by the current routing tables. Packets for a local destination are put in the queue for that port address. Incoming packets are switched to the queue for the port address if the destination is on the node, or put into the queue for the next trunk hop if it is a transit packet. The packet routing system does not distinguish between data packets or call progress packets.

To connect X.25 Trunks to Frame Relay PVCs, packets queued by the routing system are transmitted using the frame relay protocol as described in ITU-T, Q.933 and ANSI t1.617. Packets received from the frame relay PVC are queued for the routing system, along with any explicit congestion information.

The subrate feeder interface receives HDLC subrate data streams multiplexed on a DS-0 channel. It de-multiplexes and decapsulates the HDLC frames and deliver them to the link layer software.

X.25 Gateways provide a connection to other X.25 networks. They offer the option of connecting either a DCE or DTE to a similar gateway configured as the complementary DTE or DCE on the other network.

They provide the standard X.25 functionality, with the added ability to translate addresses between the two networks. This can be accomplished in several ways:

- use explicit address translation tables
- use subaddresses
- use the address extension facility from the X.25 DTE facilities
- use the user data field in the call request packet
- integrate the address assignment schemes across the two networks The X.75 gateways X.75 Gateways provide connections between X.25 networks using DNIC (Data Network Identifier Code) in the addresses. This is normally limited to public networks. The X.75 gateway (STE) connects to a similar X.75 gateway (STE) on the other network using LAPB and a form of X.25 that is similar to but more symmetric than the X.25 DTE-DCE protocol.

The network routing system must recognize the DNIC in an address and route the call to a gateway to the network identified by the DNIC. This network may be connected directly to the gateway, or indirectly via a transit network, which adds complexity to the routing decisions.

The X.25 Engine sends NUI validation requests to the NUI database as set out I.

The design of the X.25 Engine is then based on five main objects as shown in FIG. 3, namely an X.25 service encapsulator 21, an address translation database 20, a routing system controller 23, a network management interface 22, and a trunk interface 24.

In addition, the packet engine comprises a packet object, which incorporates data and flow control packets, and queue objects, which operate on Packet objects. These comprise the The LAPB receive queue, the LAPB send queue, the FR trunk send queue, the FR trunk receive queue, the packet level retransmit queue, the call router serving queue, the packet router serving queue, and the free buffer queue (sorted by address to make it easy to recombine buffers).

The X.25 Engine or packet engine supports up to 60 directly connected high speed X.25 interfaces.

A Subrate Feeder Interface provides the appropriate connection for these devices. An encapsulation technique is used to transport the X.25 HDLC frames through the FRS and backplane to the X.25 Engine. This encapsulation technique is supported on the X.25 Engine, the FRS, and any other device that will be connected to the packet engine. It allows the LAPB protocol to run transparently between the X.25 device and the X.25 Engine.

The X.25 devices use HDLC to send LAPB frames, not Frame Relay frames, to the FRS. The FRS encapsulates the LAPB frames into frame relay frames and attach a DLCI identifier. The current FRS routing software routes these frames onto the circuits to the X.25 Engine. Packets from the X.25 Engine have the frame relay header stripped off and only the LAPB frame will be sent on the link to the X.25 device.

Each X.25 device is allocated a single DLCI to the X.25 Engine. This allows the X.25 software to correctly identify the LCN and X.25 device.

The packet engine with X.25 software also terminates circuits from the FRS that carry X.25 packets encapsulated in frame relay frames. The feeder interface extracts the original X.25 packet and passes it on to the X.25 DCE software. Packets from the X.25 DCE software will be encapsulated and routed over the frame relay connection to devices on the FRS. Each device is identified either by the DLCI used to connect to it, or by addressing information contained within the encapsulation data.

The routing system controller is based on a link-state routing system similar to OSPF Open Shortest Path First. Other routing systems may be supported by implementing the appropriate routing objects. This allows integration with ATM backbone trunks.

The network management interface 22 provides communications between the X.25 software objects and the 4602 network management system.

The trunk interface 24 provides an interface to the frame relay system. Each trunk queue corresponds to a frame relay PVC. These PVCs can be very quickly configured by the network management system and put into service by the X.25 system. This gives network operators a large operational benefit and cost saving. It becomes easier and faster to fine tune the engineering and utilization of the X.25 trunks. Frame relay features such as CIR and BECN can help provide a higher quality of service to the X.25 users.

The protocol that runs between the trunk interface processes is based on LAPB. Protocol identification, routing information and the X.25 packets will be encapsulated in the information bytes of the LAPB frames.

Future trunking systems can be based on newer ATM technology. This could allow the X.25 network to dynamically deploy and configure "trunks" as required by the network traffic.

Data Flows to and from the X.25 Engine are described in the following table.

| Inputs From | Data | Data | Outputs To |
|---|---|---|---|
| 3604 or other access devices: FRS, X.25 DTU, 3601, Viper | X.25 packet encapsulated in Frame Relay | X.25 packets encapsulated in Frame Relay | 3604 or other access devices: FRS, X.25 DTU, 3601, Viper |
| CPSS | Network management information | Alarms, Status, Statistics, Billing Information | CPSS |
| Other X.25 Engines (Router sub-object) | Incoming and transit X.25 encapsulated packets Routing updates | Outgoing and transit X.25 encapsulated packets Routing updates | Other X.25 Engines (Router sub-object) |
| NUI Database | Validation info | Validation requests | NUI Database |

Figure 6:
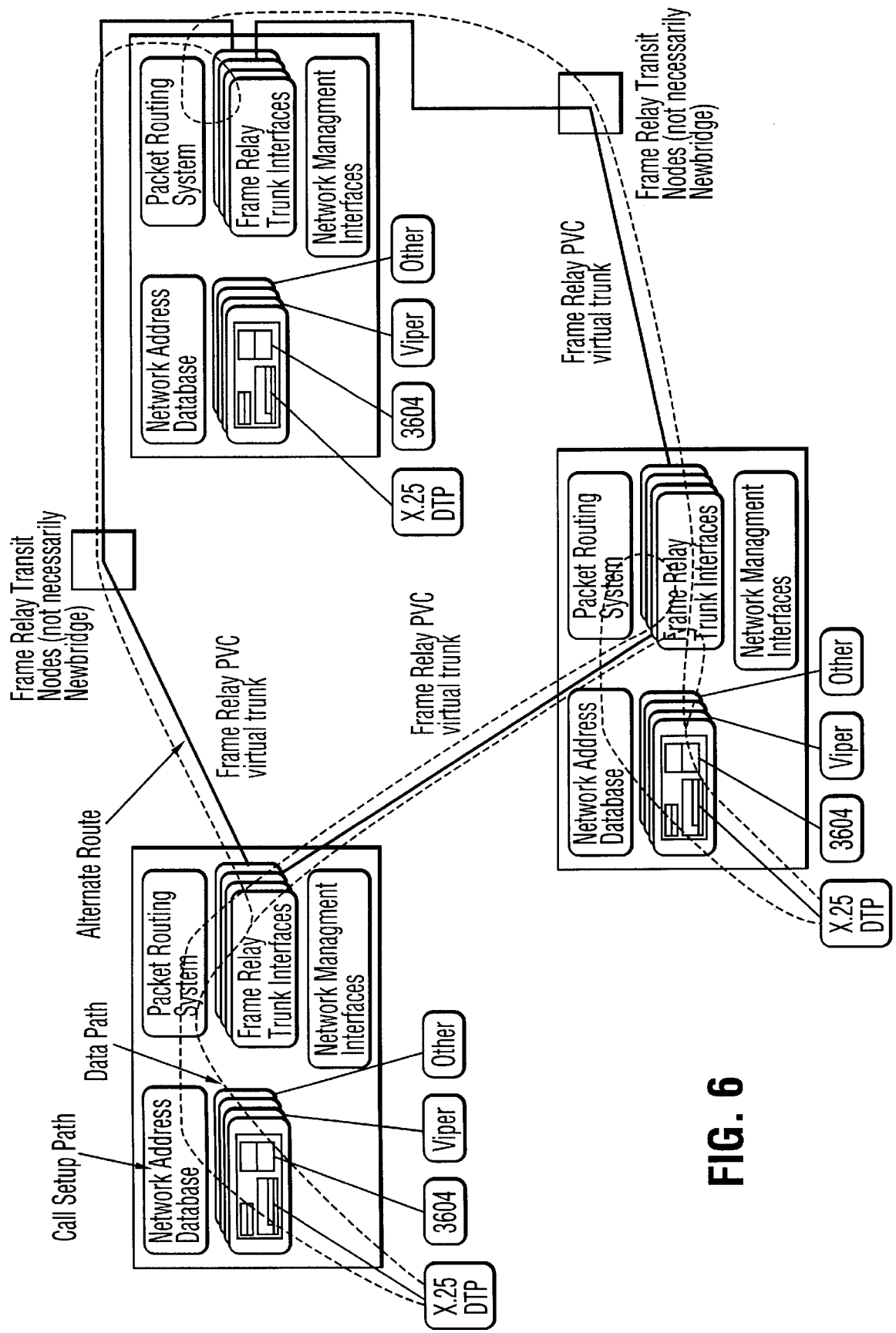
FIG. 6 shows the system data paths.
Figure 7:
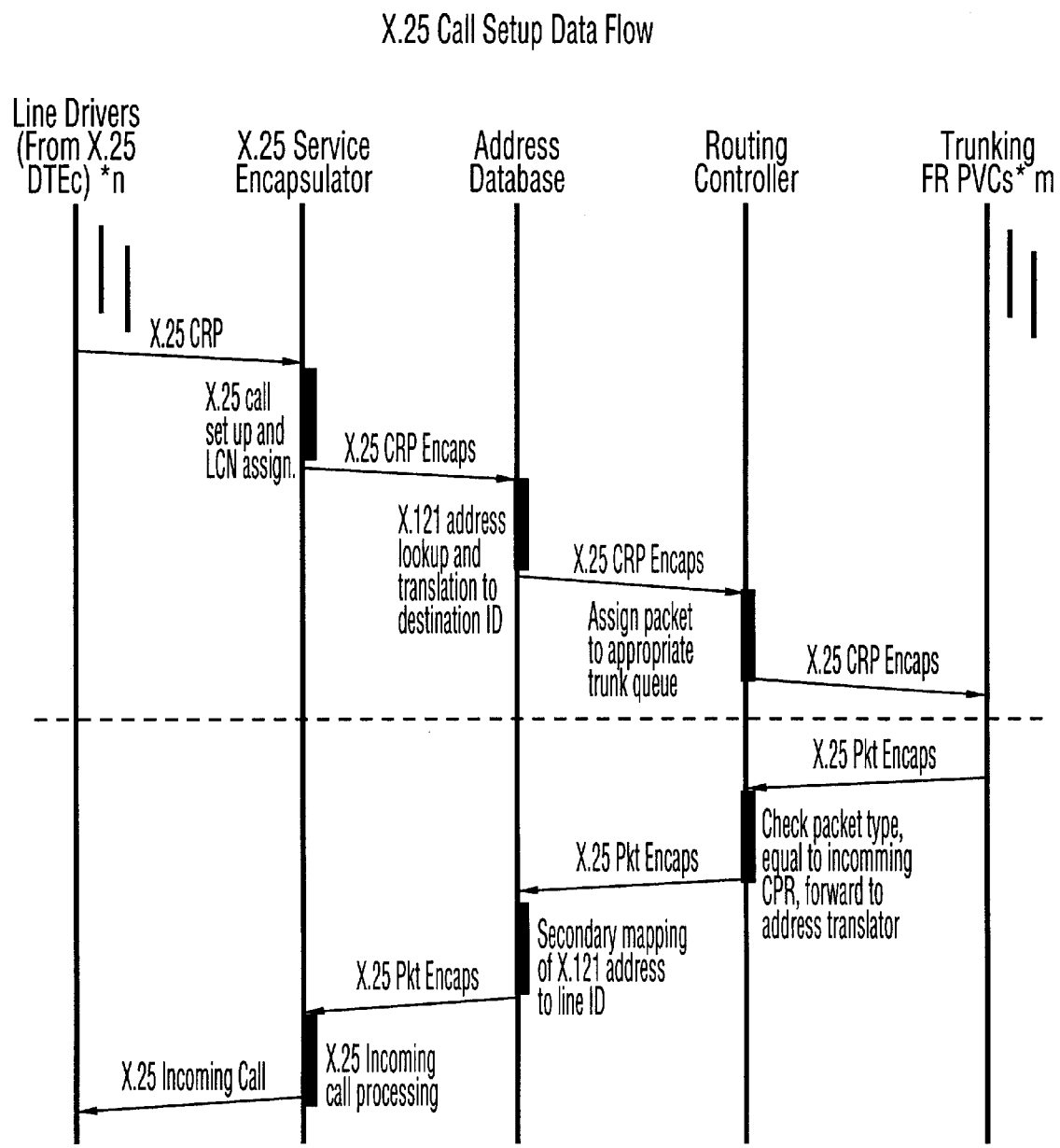
FIG. 7 shows the call set-up data flow.
Figure 8:
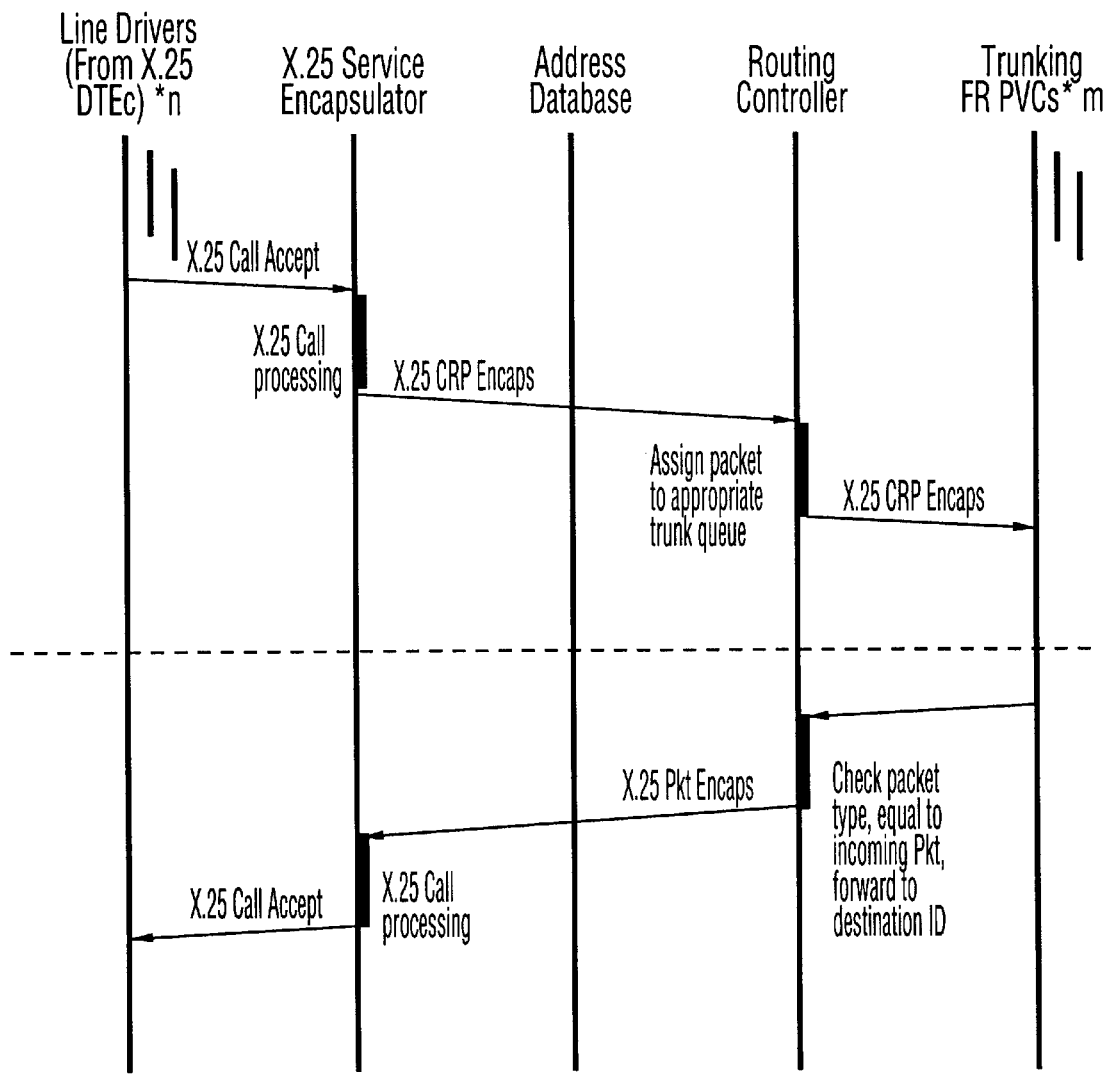
FIG. 8 shows the Call Accept and Clear Data Flow.
Figure 9:
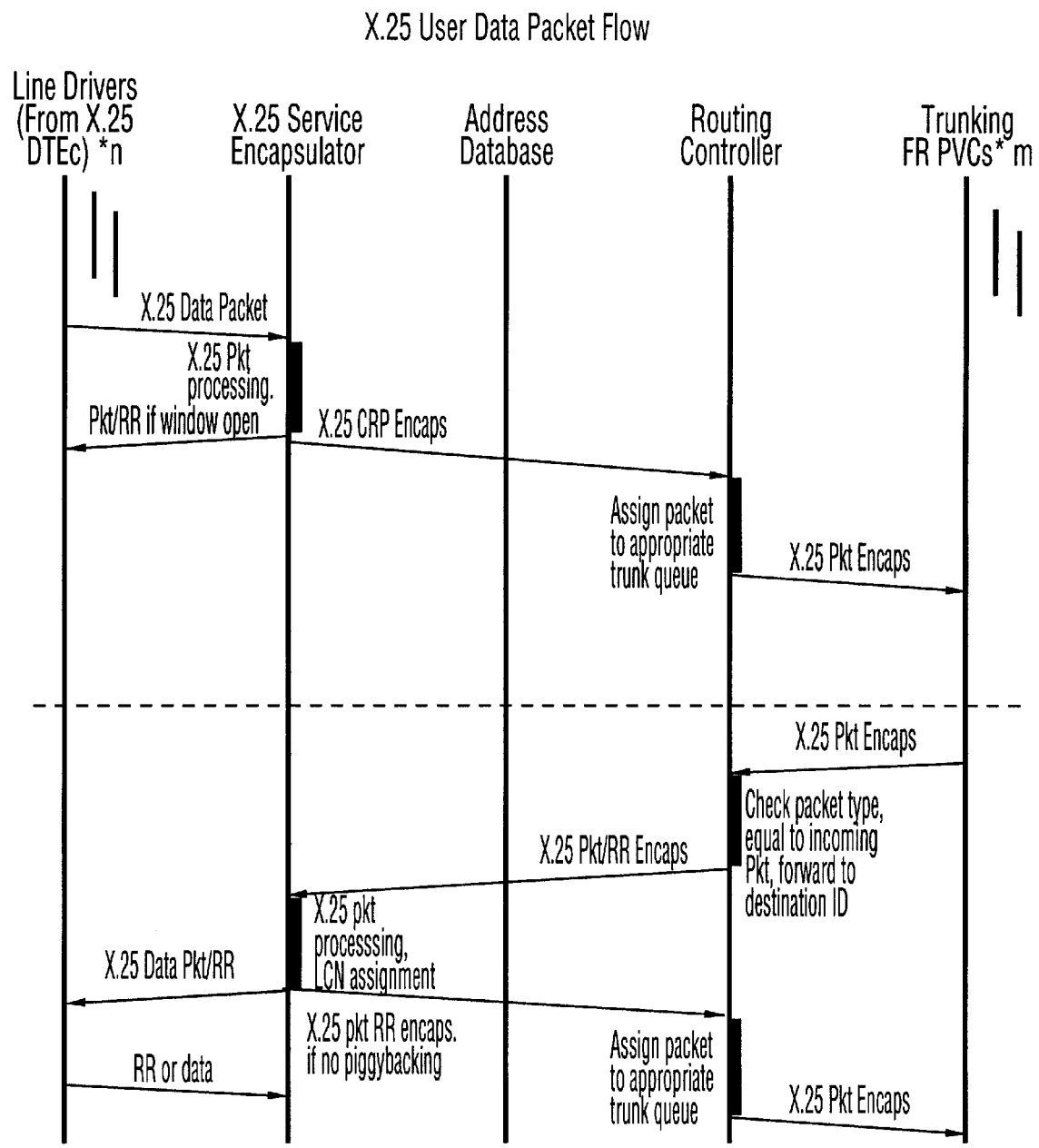
FIG. 9 shows User Data Packet Flowl
Figure 10:
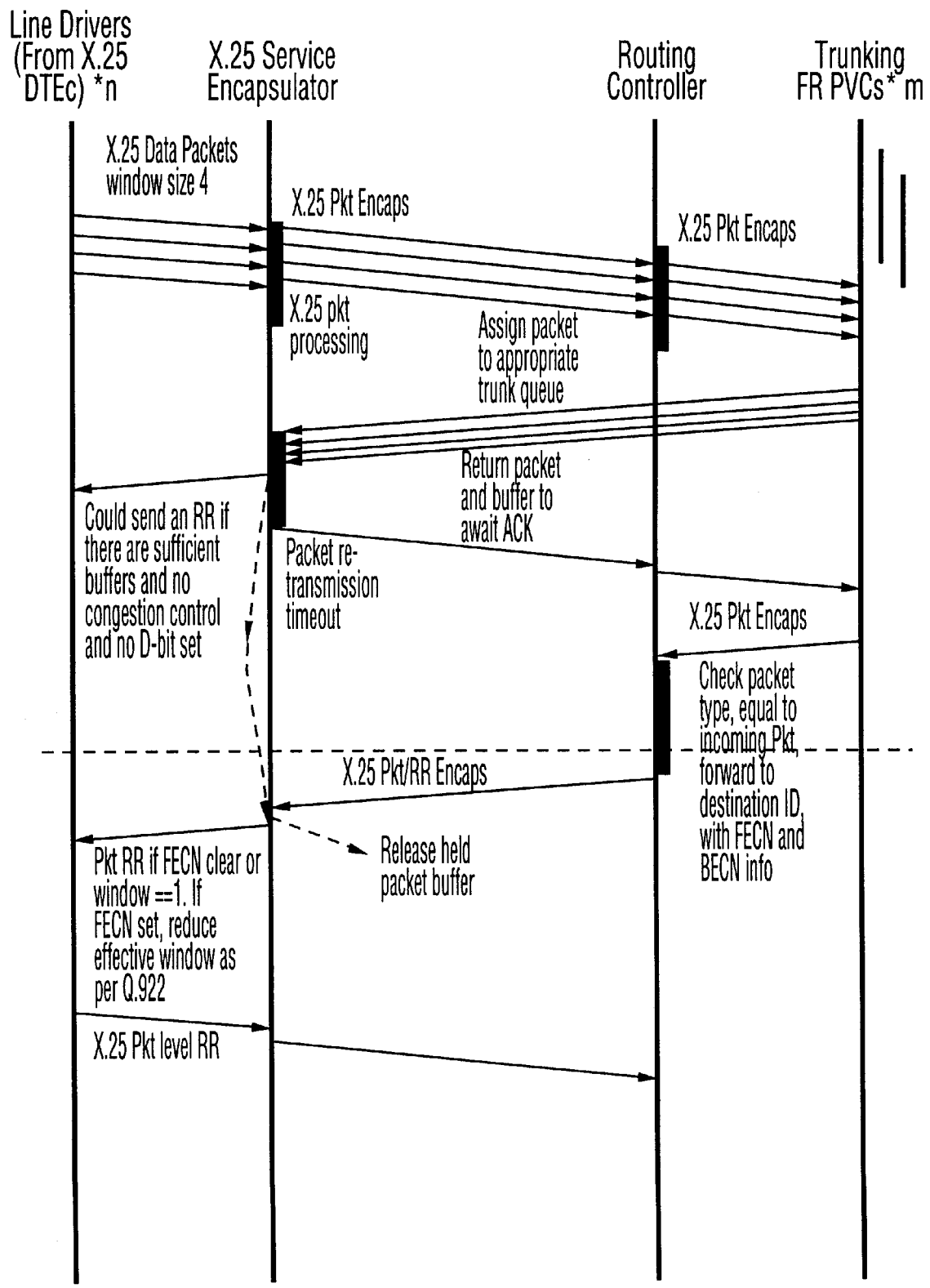
FIG. 10 shows the X.25 Data Packet Flow and Congestion Control.
Figure 11:
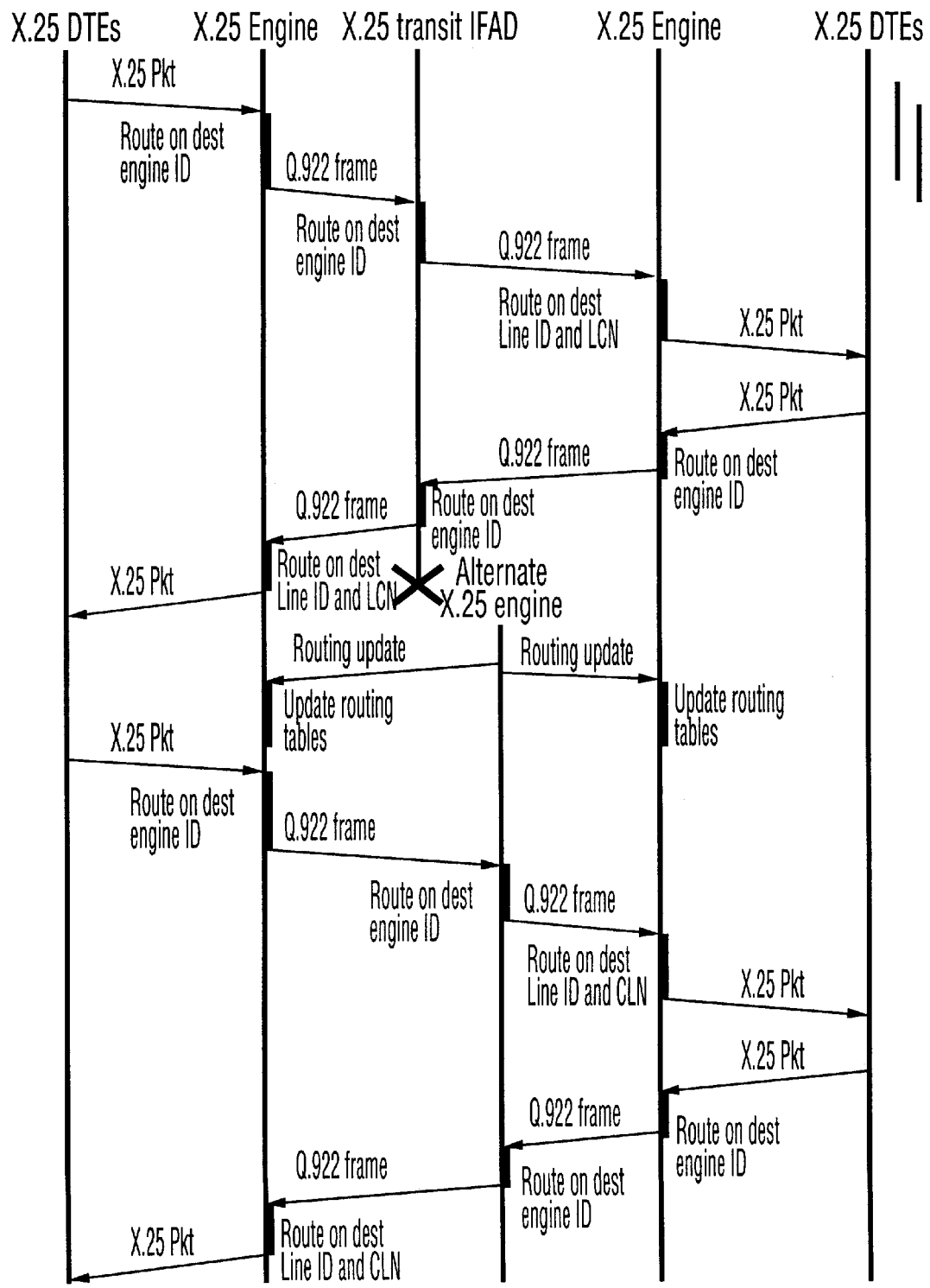
FIG. 11 shows the X.25 Data Routing.
Figure 12:
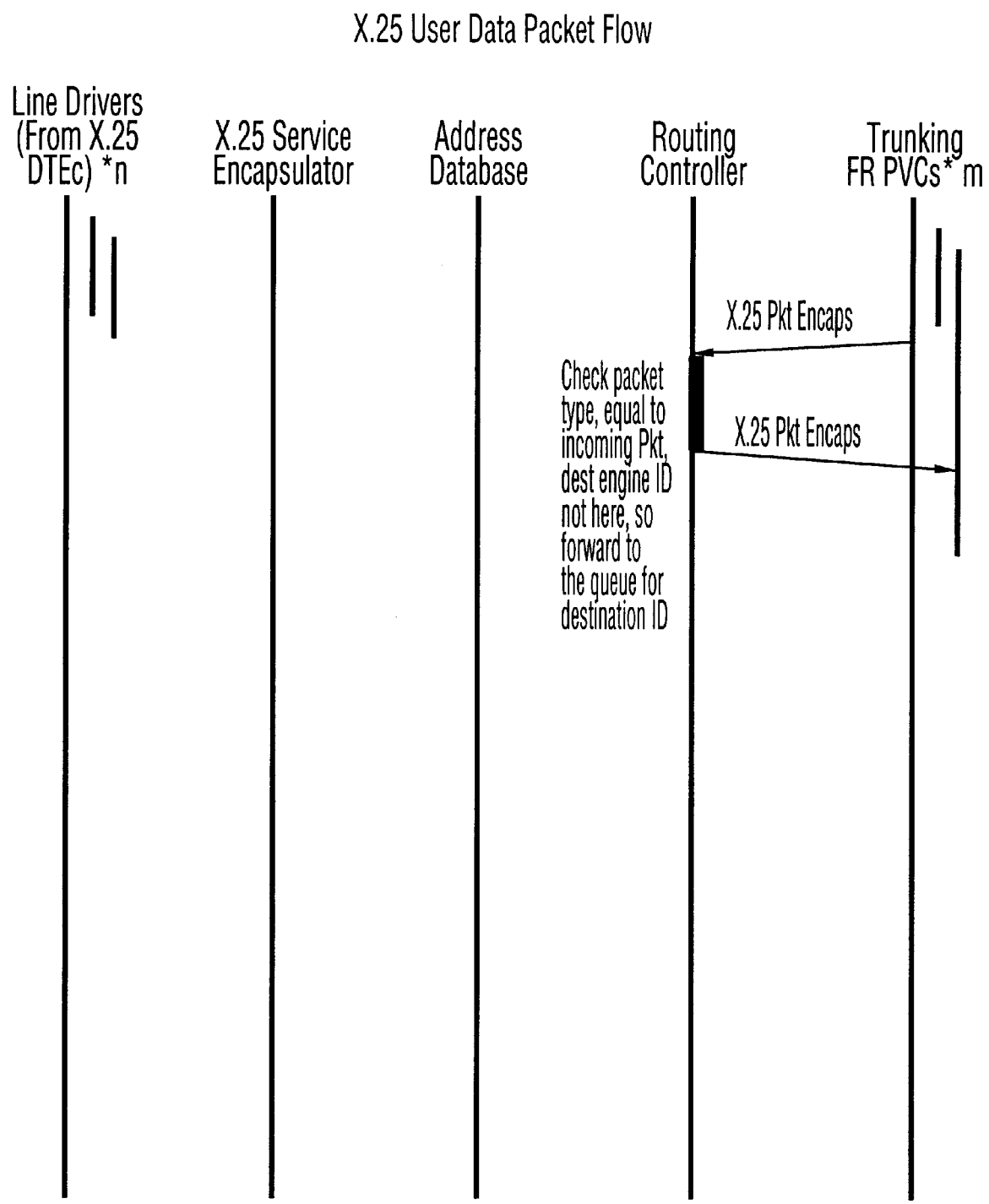
FIG. 12 shows the X.25 Transit Data Packet Flow.

The system data paths are shown in FIG. 6.

Packets being sent on a frame relay feeder interface and on the frame relay trunks need to be encapsulated within frame relay frames. This encapsulation must pass the user information and the X.25 packet information transparently. The routing information must be inserted at the sending node and examined by the routing system at transit and termination points.

Standard encapsulation techniques provide mechanisms for integrating flow control between the frame relay and X.25 protocols. Encapsulation techniques are described in Q.922 (Annex A), and ANSI T! 617a (Annex F) and FRF.3 annex F, "Multiprotocol Encapsulation Implementation Agreement".

The encapsulation techniques must notify LCNs multiplexed on the DLCI of congestion and recovery as indexed on the FECN and BECN bits, and transfer congestion information across trunk PVCs associated with each LCN.

FIGS. 7 to 12 show various data flows in the packet switching network according to the invention.

Figure 13A:
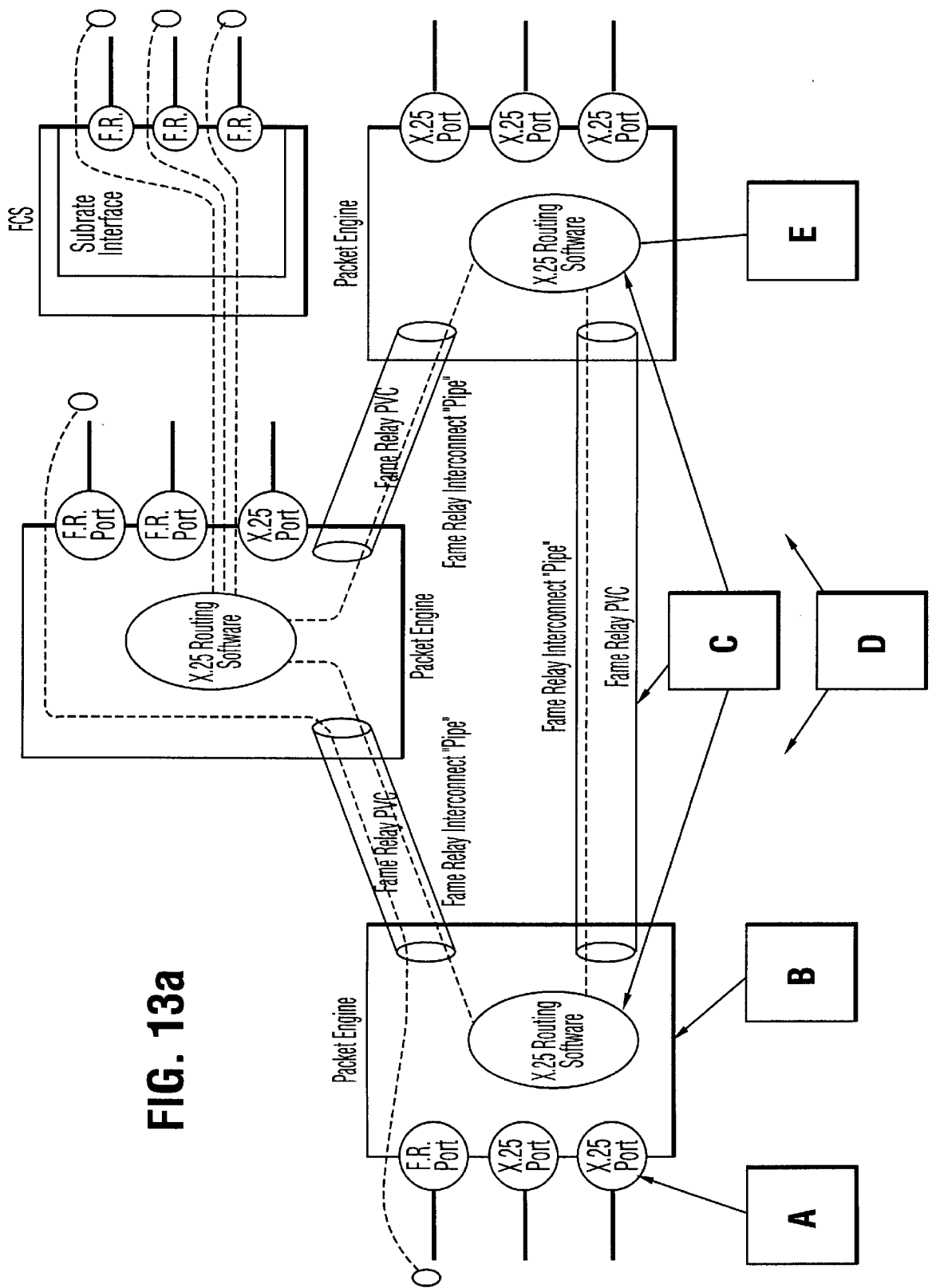
FIGS. 13a and 13b are a detailed diagram of an X.25-frame relay network.
Figure 13B:
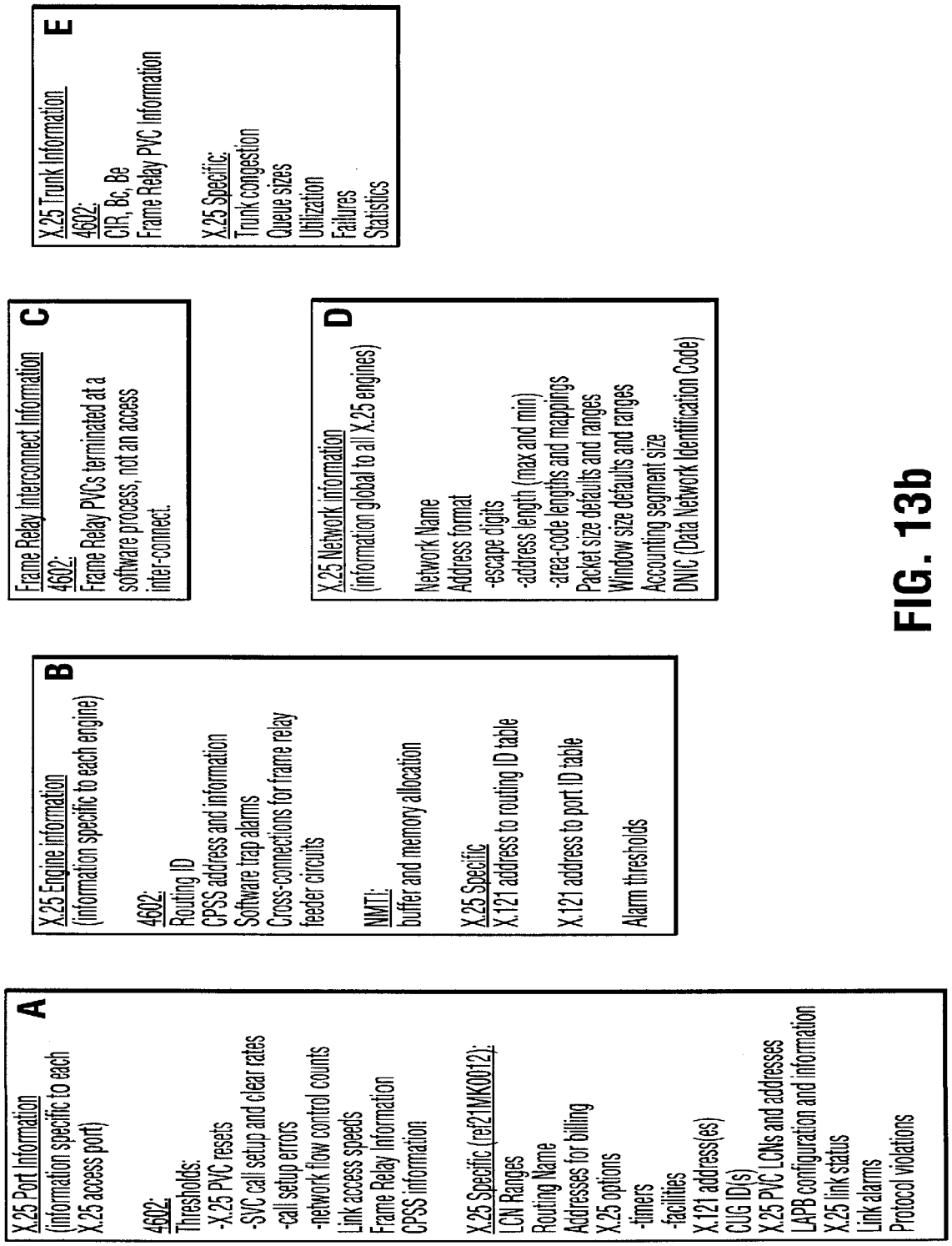

FIG. 13 shows a detailed implementation of an X.25-frarme relay newtork.

An advantage of the invention is that all the network management features and ability to provide virtual bandwidth offered by frame relay can be utilized in an X.25 service.

We claim:

1. A packet switching network supporting X-series protocol access comprising:

a plurality of X-series packet engines, each including a routing controller for X-series packets;, and a plurality of discrete trunks interconnecting said X-series packet engines for transporting packets between said packet engines under the control of said routing controller, said trunks serving as the backbone for the network and being in the form of permanent virtual connections established between pairs of said packet engines, said PVCs terminating at said packet engines of each pair; and said routing controllers monitoring the state of said PVCs and routing said X-series packets over said PVCs to establish communication between terminal devices connected to the network.

2. A packet switching network as claimed in claim 1, wherein said PVCs are integrated into a routing system that monitors the states of the PVCs and uses an Open-Shortest-Path-First-like procedure to calculate paths over the PVCs between the X-series packet engines.

3. A packet switching network as claimed in claim 1, wherein said routing controllers maintain connectivity between said packet engines over said PVCs in the event of failures, errors and congestion in the network.

4. A packet switching network as claimed in claim 3, wherein means are provided for encapsulating outgoing LAPB (Link Access Protocol Balanced) frames containing X.25 packets into frame relay frames and attaching a DLCI identifier for transmission over the identified permanent virtual connection.

5. A packet switching network as claimed in claim 1, wherein said PVCs are frame relay PVCs.

6. A packet switching network as claimed in claim 5, wherein frame relay explicit congestion notification (ECN) bits are used by the packet engines to provide flow control in the individual permanent virtual connections.

7. A method of transferring X.25 packets between packet engines, each including routing software for the X.25 packets, comprising the steps of establishing permanent virtual connections between pairs of said packet engines using frame relay protocol, selecting permanent virtual connections with said routing software to route packets between said packet engines, encapsulating the X.25 packets into frame relay frames and attaching a DLCI (Data Link Connection Identifier) identifier, transmitting the encapsulated frames between the packet engines over said permanent virtual connections under the control of said routing software, and stripping off the frame relay header from the received encapsulated frames to recover the X.25 packets.

* * * * *